United States Patent [19]
Paul et al.

[11] Patent Number: 4,876,988
[45] Date of Patent: Oct. 31, 1989

[54] COMBINED FUEL ENGINE

[76] Inventors: Marius A. Paul; Ana Paul, both of 967 La Paz, Placentia, Calif. 92670

[21] Appl. No.: 206,229

[22] Filed: Jun. 13, 1988

[51] Int. Cl.⁴ ............................................. F02B 75/12
[52] U.S. Cl. .............................. 123/1 A; 123/27 GE; 123/577
[58] Field of Search .................. 123/27 GE, 1 A, 577, 123/576, 65 BA, 299

[56] References Cited

U.S. PATENT DOCUMENTS

| | | | |
|---|---|---|---|
| 2,994,187 | 8/1961 | Kelgard | 123/27 GE |
| 3,406,666 | 10/1968 | Steiger | 123/27 GE |
| 4,480,968 | 11/1984 | Duerr | 183/65 BA |
| 4,513,727 | 4/1985 | Lagano et al. | 123/27 GE |
| 4,539,948 | 9/1985 | Toepel | 123/65 BA |
| 4,742,801 | 5/1988 | Kelgard | 123/27 GE |
| 4,791,781 | 12/1988 | Paul et al. | 60/605 |

FOREIGN PATENT DOCUMENTS

WO86/04388 7/1986 PCT Int'l Appl.

*Primary Examiner*—E. Rollins Cross
*Attorney, Agent, or Firm*—Bielen and Peterson

[57] ABSTRACT

A combined fuel engine for reduced emission pollution in which the engine is provided with a conventional fuel injection system for injecting a conventional fuel such as gasoline or diesel oil high in carbon into a combustion chamber proximate the cycle time of peak compression and with an auxiliary fuel injection system for injecting an auxiliary fuel such as methanol, ethanol or liquefied natural gas high in hydrogen into the combustion chamber with the charge of air proximate the cycle time of low compression with means for varying the proportion of fuels to achieve a lean combustible mixture.

10 Claims, 1 Drawing Sheet

COMBINED FUEL ENGINE

BACKGROUND OF THE INVENTION

This invention relates to a pollution control system that can be adapted to existing engines, particularly heavy duty engines used in transport and mass transit systems. Pollution from heavy duty engines has reached a critical proportion, since many of the engines have been in the past exempt from pollution control regulations. However, with the increasing concern over urban pollution, regulation will become increasingly stringent for all vehicles, including those vehicles which have enjoyed past exemptions. Of particular concern is the diesel engine which frequently emits carbon particulate matter that is being recognized as a serious health concern. While advanced diesel engines have been designed that substantially reduce the emission of pollutants, existing engines lack those controls that provide for efficient combustion. Furthermore, existing engines easily become out of tune resulting in substantial increase in emissions.

Problems in the design of existing diesel engines are traced to poor combustion chamber configurations, inadequate air-fuel mixtures, insufficient atomization of injected fuels, and the characteristic high carbon content of conventional fuels.

The use of superchargers has improved the ability to supply sufficient air for combustion under most conditions. However, because of the inefficiency of most supercharger designs, substantial extraction of power is required for minimal compression of air. Additionally, while it has been proposed to utilize fuels that are rich in hydrogen such as methanol, alcohol and liquefied natural gas, the existing fuel injection systems are inadequate to handle the lower Btu content of the preferred fuel. Since the Btu content is approximately 50% less then existing diesel fuels or gasoline, the fuel injection systems of the engines must be totally revised in order to accommodate the necessary larger volumes of fuel required for normal operation. Furthermore, the substantially increased volume of fuel that is injected during each engine cycle creates ignition problems due to the quantity of cold fuel required to be vaporized. The proposed combined fuel engine for pollution reduction solves these problems and improves engine performance at the same time that pollution is substantially reduced.

SUMMARY OF THE INVENTION

The combined fuel engine of this invention relates to a multi-fuel engine that utilizes both high hydrogen content fuels such as methanol, ethanol and liquefied natural gas, concurrently with diesel fuel. The existing system for introducing diesel fuel into the engine can be utilized with minor adaptations to insure that the fuel mix does not diminish the engine performance. A separate fuel introduction system is utilized for the lower Btu content auxiliary fuel. In order to insure complete combustion of the fuel mixture, a positive displacement, rotary compressor is utilized to boost air compression such that a lean mixture is achieved to enable full and complete combustion of the fuel mixture. Preferably, the positive displacement rotary compressor is operated in conjunction with a turbocharger that utilizes exhaust gases for precompression of the intake air before full compression by the rotary compressor. The rotary compressor provides internal compression that substantially exceeds existing superchargers such as the external blower utilized on many heavy duty engines.

In addition to compensating for the loss in temperature that accompanies the injection of an increased volume of fuel, the substantially increased quantity of compressed air provides a lean mix that fully combusts the fuel mixture while maintaining peak combustion temperatures below the nitrogen fixation temperature. Preferably, the auxiliary fuel can comprise 95% of the combusted fuel volume and can be utilized to precool various high temperature components of the engine system before being injected into the combustion or aspiration channels of the engine. When using the auxiliary delivery system for injecting the auxiliary fuel into the engine, the engine can be operated under a variety of conditions ranging from full conventional fuel operation to a minimum conventional fuel supply for pilot ignition. The use of dual fuel supply systems also enables a blend of diesel and other fuel to be utilized in the primary fuel injection system which blend is supplemented by additional auxiliary fuel from the auxiliary supply system such that full power is achievable.

These and other features of the system will become apparent from a consideration of the detail description of the preferred embodiment disclosed herein.

DETAILED DESCRIPTION OF THE PREFERRED EMBODIMENTS

Figures 1, 2:
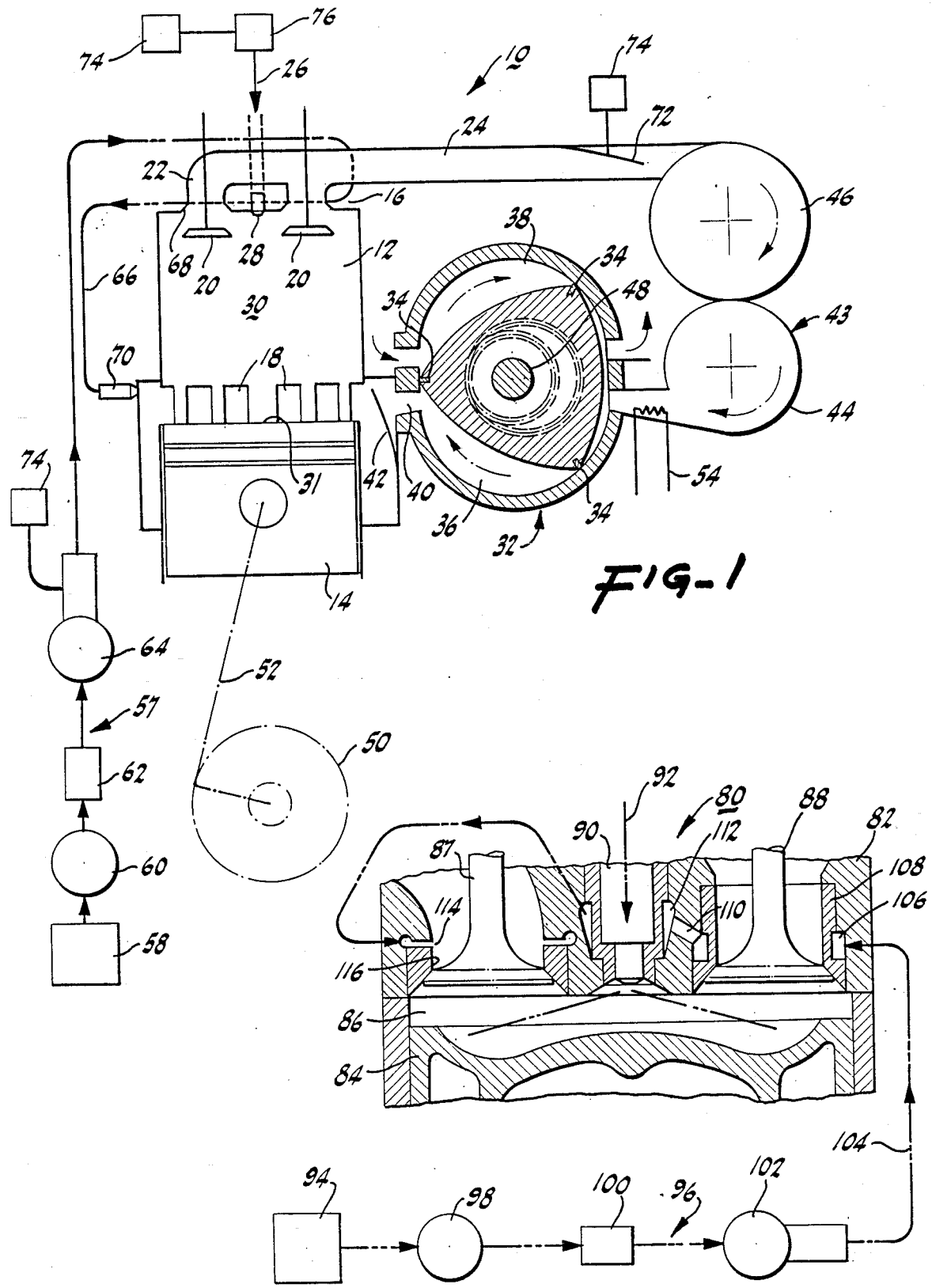
FIG. 1 is a schematic diagram of the combined fuel engine system for two cycle engines.
FIG. 2 is a schematic illustration of the combined fuel system in the injection portion of a four cycle engine.

Referring now to the drawings, FIG. 1 is a schematic illustration of an internal combustion, reciprocal engine of the two-cycle type designated generally by the reference numeral 10. The two-cycle engine includes a cylinder 12, a piston 14 reciprocal in the cylinder and a piston head 16. Around the perimeter of the cylinder 12 is a series of air intake ports 18 which are exposed when the piston 14 is at the bottom of its power stroke as shown in FIG. 1. Poppet valves 20 provide for timed exhaust of combusted gases through exhaust ports 22 leading to an exhaust conduit 24. Conventional fuel such as diesel oil, is injected through fuel line 26 by fuel injector 28 into the combustion chamber 30 formed by the cylinder head 16, the cylinder 12 and the piston head 31.

Compressed air is delivered through the intake ports 18 by a positive displacement, rotary compressor 32 which includes a sealing system in part illustrated by end seals 34 for delivering high pressure air to the engine cylinder 12 for further compression by the piston 14.

The rotary compressor 32 is of a Wankel-type and includes two compression chambers 36 and 38, one of which is shown communicating with cylinder 12. The other compression chamber 38 can be coupled to an adjacent cylinder of a multi-cylinder engine. The compression chamber outlet 40 is protected by flap valve 42 to prevent any back flow of combusted gases before the gases are exhausted through exhaust ports 22. Once the pressure in the compression chamber exceeds that of the remaining combusted gas in the cylinder the flap valve permits the compressed air to scavenge remaining combustion gases and charge the cylinder with fresh compressed air.

In the preferred embodiment, the rotary compressor 32 is supplied precompressed air by a conventional turbocharger 43. The turbo-charger 43 has an air compression side 44 and a gas expansion side 46. The gas expansion side 46 is connected to the exhaust conduit 24 such that the turbo-charger is driven by the exhaust gases from the combustion chamber. In the preferred embodiment, the rotary compressor 32 is driven by a geared shaft 48 connected to a crank shaft 50 of the engine. The crank shaft 50 is of course connected to the piston 14 by a conventional connecting rod 52.

In an alternate embodiment, the rotary compressor can comprise a rotorcharger that is constructed in Wankel-type configuration, but with a gas expansion side and an air compression side as described in our patent entitled, REGENERATIVE THERMAL ENGINE, U.S. Pat. No. 4,791,787, issued, Dec. 20, 1988.

While the positive displacement rotary compressor 32 can deliver a substantially greater quantity of air to the cylinder than a conventional supercharger, the use of the coupled turbocharger 43 and an intermediate intercooler 54 enables the desired excess charge to be delivered to the cylinder for insuring a lean mixture under all operating conditions. Charged air in the range between 5 and 20 atmospheres is preferred and achievable with the systems described.

In addition to the standard fuel injector 28 for injecting a conventional fuel into the engine, the engine includes an auxiliary fuel delivery system 57 which includes a fuel supply 58 for an alternative fuel such as methanol, ethanol, hydroammonia or liquid natural gas. The system 57 also includes a fuel pump 60 which forces fuel through a filter 62 to a fuel injector 64, which is preferably electronically controlled, a cooling line 66 which passes around the valve seats 68 and a fuel injector nozzle 70 for injecting the preheated fuel into the intake ports 18 once the exhaust valves 20 have closed and the rotary compressor 32 is delivering its air charge to the cylinder 12. In this manner according to the operation and timing of the injector pump 64, auxiliary fuel can be supplied into the air intake stream entering a combustion chamber 30. The auxiliary fuel charge is kept on the lean side to prevent premature detonation. Detonation is caused by a final injection of conventional fuel through the fuel injector 28 during the period of peak compression. Because of the substantial supercharging of the air charge, over scavenging of the cylinder and loss of the air charge is prevented by a throttle valve 72 in the exhaust conduit 24. The throttle valve 72 impedes the exhaust flow creating a controlled, backpressure which effectively enables regulation of air and gas flow through the engine. The throttle valve 72 and the injector pump 64 are electronically controlled by a microprocessor 74. The microprocessor is of a conventional type that is commonly used in modern engine and includes various sensors for sensing engine load, exhaust temperature operating demands and other factors.

When a separate auxiliary fuel system is employed, substantially the entire existing fuel injection system can be utilized without modification. In a microprocessor controlled system, however, it is preferred that at least the electronic feed pump 76 be coupled to the fuel injector 28 such that the fuel allocation and quantities can be regulated by a connection microprocessor 74.

In operation, the engine can be operated using the conventional fuel injection system alone, for example during long haulage cross country, and incorporate the combined fuel system during operation in urban areas. Up to approximately 95% of the fuel by volume can be supplied by the auxiliary system. Improved anti-pollution benefits result as the percentage of the auxiliary fuel increases over the conventional fuel. It is recognized that the auxiliary fuel has a substantially reduced Btu content over conventional diesel oils and gasolines. The hybrid systems disclosed, however, provides a substantially improved system over conventional engines where the vehicle is operated in urban areas or in areas where pollution control is a substantial consideration. Where fuel capacity is not of critical importance, such as in short hauls or in strictly urban use, blended fuels can be used in the conventional fuel engine system. This would allow the existing fuel injection system to be operated at full fluid capacity while the combustion cycle is supplemented by induction of the supplementary auxiliary fuel for appropriate thermodynamic operation.

The combined fuel system can be adapted to four cycle engines as well. Referring to FIG. 2, a portion of an engine designated generally by the reference numeral 80 is shown with an engine head 82, a piston head 84 and a combustion chamber 86. The piston head 82 includes an intake valve 87 and an exhaust valve 88 mounted on each side of a centrally located fuel injector 90. The fuel injector 90 provides fuel, such as gasoline or diesel oil to the combustion chamber 86 through a supply line 92. An auxiliary fuel supply 94 for the low polluting, high hydrogen content fuel, such as methanol, ethanol, hydroammonia or liquid natural gas is delivered through an auxiliary system 96 to the engine 80. The auxiliary system 96 includes a fuel pump 98, fuel line filter 100 and an electronically controlled injection pump 102 that delivers the auxiliary fuel through a cooling circuit 104 that passes through a cooling jacket 106 in a valve seat collar 108, passes through connecting passage 110 to a cooling chamber 112 around the injector nozzle 90 before being delivered to a series of outlet passages 114 in the intake port 116 for the intake valve 186. The preheated fuel after cooling the hot areas of the engine head 82, are inducted into the combustion chamber with the intake air for compression and combustion with the fuel injected through the injection nozzle 90. The engine 80 of FIG. 2 can preferably be operated with the various auxiliary components shown in connection with the engines of FIG. 1.

As previously noted, the engines can be operated either in a conventional mode where pollution is not of a substantial concern or in a mode that provides up to 95% of the engine fuel from the auxiliary fuel system. Final injection of a quantity of the conventional fuel is required to initiate detonation. The engine is designed to operate with an excess quantity of air such that nitrogen oxide formation are inhibited. Preferably, in both systems, excess air is delivered by a positive displacement, rotary compressor in combination with a throttle valve in the exhaust conduit to maximize the pressure and quantity of air delivered through the cylinder.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A combined fuel engine for reduced emission pollution comprising:
   a cylinder with at least one piston reciprocal therein with a cycle having at least a compression stroke and a power stroke, the cylinder and piston forming in part a combustion chamber,
   an air intake port and a combustion gas exhaust port communicating with the combustion chamber,
   first fuel injection means with a first fuel supply for injecting a first conventional fuel from the high carbon group including gasoline and diesel oil stored in the first fuel supply into the combustion chamber proximate the cycle time of peak compression at the end of the piston compression stroke, and
   second fuel injection means with a second fuel supply for injecting a second auxiliary fuel from the high hydrogen group including methanol, ethanol and liquefied natural gas stored in the second fuel supply into the intake port of the combustion chamber proximate the cycle time of low compression at the beginning of the piston compression stroke after the exhaust port is closed, the second fuel supply including a fuel supply line to the intake port that includes means for cooling hot areas of the engine while preheating the fuel before injection into the combustion chamber,
   means for varying the proportion of fuel injection from the first fuel injection means from 100% to 5% of fuel required for a lean combustible mixture and concurrently varying the fuel injected from the second fuel injector means to provide a fuel charge that provides the balance of fuel required for such lean combustible mixture wherein the fuel charge from the second fuel injector means is maintained sufficiently lean to prevent premature detonation, wherein detonation results upon injection of fuel by the first injection means.

2. The engine of claim 1 wherein the engine includes air compression means for delivering a precompressed air charge to the air intake port wherein a lean mixture of fuel in the air charge is provided for complete combustion of the fuel.

3. The engine of claim 2 wherein the air compression means includes a positive displacement, rotary compressor with a sealed rotor for high pressure precompression.

4. The engine of claim 3 wherein the air compression means includes a turbocharger having a first section connected to the rotary compressor for precompressing air supplied the rotary compressor and a second section having a conduit connected to the combustion chamber exhaust port, the turbocharger being driven by exhaust gasses passing through the second section of the turbocharger.

5. The engine of claim 2 wherein the exhaust port is connected to an exhaust conduit, the exhaust conduit having valve throttling means for regulating the flow of exhaust through the exhaust conduit and the flow of air into the combustion chamber.

6. The engine of claim 5 wherein the valve throttling means is controlled by a microprocessor in response to sensed engine conditions and operating demands.

7. The engine of claim 1 wherein the first fuel injector means is electronically controlled by a microprocessor in response to sensed engine conditions and operating demands.

8. The engine of claim 7 wherein second fuel injector means is electronically controlled by a microprocessor in response to sensed engine conditions and operating demands.

9. The engine of claim 1 wherein the second fuel injector means injects fuel into the intake port.

10. The engine of claim 1 wherein the second fuel injection means injects supplemental fuel to achieve a lean combustible mixture.

* * * * *